United States Patent [19]

Denno et al.

[11] Patent Number: 5,493,613
[45] Date of Patent: Feb. 20, 1996

[54] COMBINATION PIN PAD AND TERMINAL

[75] Inventors: Rodney G. Denno, Brampton; Martin F. Hemy, Palgrave; Charles R. Sutton, Beeton, all of Canada

[73] Assignee: International Verifact Inc., Toronto, Canada

[21] Appl. No.: 119,484

[22] Filed: Sep. 13, 1993

[51] Int. Cl.$^6$ .............................. H04L 9/00; H04L 9/06; H04L 9/08; H04L 9/32

[52] U.S. Cl. ......................... 380/24; 380/4; 380/9; 380/21; 380/23; 380/29; 380/49; 235/379; 235/380

[58] Field of Search ...................... 235/379, 380; 380/4, 9, 23, 24, 25, 49, 50, 21, 29

[56] References Cited

U.S. PATENT DOCUMENTS

| | | | |
|---|---|---|---|
| 3,778,595 | 12/1973 | Hatanaka et al. | 235/379 |
| 3,845,277 | 10/1974 | Voss et al. | 235/379 |
| 3,862,716 | 1/1975 | Black et al. | 380/24 X |
| 3,973,237 | 8/1976 | Sawaguchi et al. | 235/379 |
| 4,183,085 | 1/1980 | Roberts et al. | 380/23 |
| 4,302,810 | 11/1981 | Bouricius et al. | 380/24 |
| 4,408,203 | 10/1983 | Campbell | 235/379 X |
| 4,509,136 | 4/1985 | Horigome et al. | 235/379 X |
| 4,529,870 | 7/1985 | Chaum | 235/380 |
| 4,536,647 | 8/1985 | Atalla et al. | 235/379 |
| 4,949,240 | 8/1990 | Iijima | 235/380 X |
| 5,237,609 | 8/1993 | Kimura | 380/23 |

FOREIGN PATENT DOCUMENTS

| | | | |
|---|---|---|---|
| 0186981 | 7/1986 | European Pat. Off. | G07F 7/10 |

*Primary Examiner*—Bernarr E. Gregory

[57] ABSTRACT

A secure terminal is disclosed which has a single keypad and display which is suitable as a debit terminal, as both confidential and nonconfidential information can be entered. Confidential information is entered in secure text mode whereas nonconfidential information is entered in clear text mode. The terminal defaults to secure text mode where all information is encrypted. In clear text mode all prompts are independently authenticated by a secure module prior to displaying of the prompt. Prompts for clear text mode are preprogrammed preferably with an Authentication Parameter which is confirmed by the secure module whenever that prompt is used in clear text mode. The invention is also directed to the methods for rendering a terminal and system secure for receiving confidential and nonconfidential information.

14 Claims, 4 Drawing Sheets

IF PASSWORD OLD DOES NOT MATCH THE STORED PASSWORD OLD
THEN KTKL AND KTKR AND PASSWORD NEW ARE NOT STORED

FIGURE 7

| HSM | TERMINAL | |
|---|---|---|
| | SM of Terminal | Non-SM of Terminal |
| - Key generation<br>- DTK encryption software<br>- MAC software uses DTK + Prompt to generate (Prompt, MAC) pairs | - decryption software for eKTK (DTK)<br>- encryption software for RN1 + RN2<br>- encryption for secure text<br>- Check Value | Logic to determine Clear Text Entry (CTE) or Secure Text Entry (STE)<br>If CTE then all Prompts go to Secure Module to be authenticated<br>- software applications |
| 1) Generate KTK + DTK<br>2) Encrypt DTK using KTK -- eKTK (DTK) encoded DTK + Check Value<br>3) Generate Prompt MAC using Prompt + DTK to get (Prompt, MAC) pairs | 4) Load KTK + eKTK (DTK) (encoded DTK) + Check Value<br>5) Decrypt eKTK (DTK) to get DTK and confirm by Check Value<br>6) Generate RN1 + RN2 when Check Value matches<br>7) Load (Prompt, MAC) pairs<br>8) Check (Prompt, MAC) pairs using DTK + Prompt using MAC software to generate MAC - must match with loaded MAC under 7)<br>9) ReMAC Prompt, MAC using Prompt, RN1, RN2 to generate new Authentication Parameter, i.e. SM generated (Prompt, Authentication Parameter) pairs | 10) Store SM generated (Prompt, Authentication Parameter) pairs |

COMBINATION PIN PAD AND TERMINAL

FIELD OF THE INVENTION

The present invention relates to terminals, such as point of purchase terminals which are required to receive both nonconfidential data and confidential data. In particular, the invention is directed to a terminal having one key pad by means of which confidential data can be entered in a secure manner and nonconfidential data can be transmitted in a nonsecure manner.

BACKGROUND OF THE INVENTION

Point of purchase terminals or other terminals which receive both confidential and nonconfidential information are known. Terminals for debit card transactions are known where certain information is confidential, such as PINs (personal identification number), and other information is nonconfidential, such as the purchase price of a product. Other confidential information could include the account balance whereas license plate identification for a gas purchase would be nonconfidential.

Initial terminals had two entry keypads, one of which could be for nonconfidential information and having its own separate display and the other being a dedicated keypad for confidential information, such as the PIN. Typically, the keypad for inserting confidential information could be separated and the user could actually shield the keypad during the entry of the confidential information. Although the keypad for the confidential information typically had a display, only prompts came up on the display and the confidential information was not displayed.

There has been a need to reduce the space occupied by such point of purchase terminals and there are now point of purchase terminals having a single display and a single keypad for receiving both confidential and nonconfidential information. Unfortunately, the degree of security which was previously present with a separate keyboard for confidential information has not been provided in these combined confidential and nonconfidential information keyboards and there is a higher risk that these devices could be tampered with to reveal confidential information of the user. The entire system is based on the premise of the PIN being maintained in a confidential manner, as this is in effect the signature of the user and his authorization. There remains a need to provide a system which reduces the size of the point of purchase terminal while maintaining a high degree of security with respect to the entry of confidential information and the operation of the terminal such that it can only operate in a secure manner with respect to prompts which would produce the entry of confidential information.

SUMMARY OF THE INVENTION

A debit or other terminal, according to the present invention, comprises a secure module, a display, a keyboard and a nonsecured portion. The secure module controls the communication of data and prompts between the keyboard, the display and the nonsecured portion of the terminal in either a clear text mode or a secure text mode. The keyboard allows the entry of either clear text or secure text. The nonsecured portion of the terminal has a predetermined group of paired prompts and authentication parameters that are authorized for clear text mode. The secure module also has confirmation means to independently confirm that the prompt of a prompt pair received from the nonsecured portion is a proper prompt for clear text mode prior to communication of the prompt to the display. With this arrangement, if the terminal was operating in clear text, which is a nonsecured mode, the prompt is confirmed to be a proper prompt by the secure module prior to allowing the prompt to be communicated to the display or before data can be entered at the keypad. In this way, when the device is operating in clear text mode, each prompt is reviewed and confirmed to be a proper prompt. The terminal in secure text mode does not authenticate each prompt, as the signals are being transmitted in secure text mode and, thus, are encrypted or appropriately process by the secure module. With this arrangement, a more secure terminal is realized while achieving the benefits of reduced size of the debit terminal due to the use of a common display and keyboard for both clear text and secure text modes.

The present invention is also directed to the loading of the terminal and the combination host secure module and terminals and the various methods carried out by each of the components and the various combinations thereof.

BRIEF DESCRIPTION OF THE DRAWINGS

Preferred embodiments of the invention are shown in the drawings, wherein:

FIG. 7 is an overview of the terminal and host secure module.

DETAILED DESCRIPTION OF THE PREFERRED EMBODIMENTS

Figure 1:
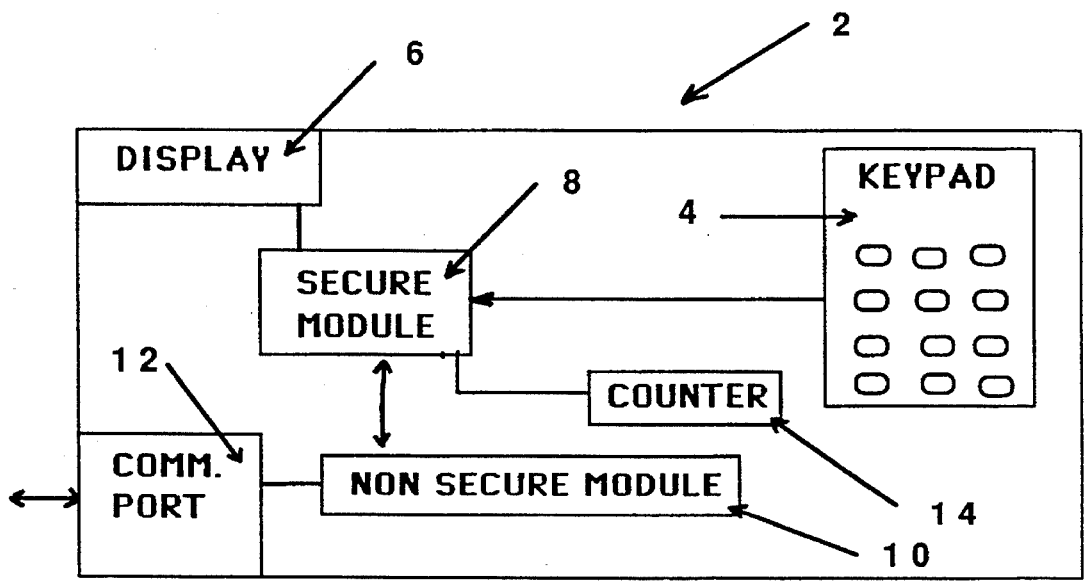
FIG. 1 is a schematic of the terminal.

Data encryption as used herein normally refers to Data Encryption Standard, NBS FIPS PUB 46, Federal Information Processing Standards Publication (Jan. 15, 1977). Reference is made to the following publications:

DES Modes of Operation, NBS FIPS PUB 81, Federal Information Processing Standards Publication (Dec. 2, 1980);

ANSI X3.28-1976, Subcategory 2.4 Establishment and Termination Control Procedures 1976;

Financial Institution Retail Message Authentication, American Bankers Association, ANSI X9.19-1986 (MAC);

Personal Identification number (PIN) Management and Security, ANSI X9.8-1982;

ISO 8730, ISO Standard for Message Protection; and

ISO 9564, ISO Standard for PIN Protection.

The terminal shown as 2 includes a common keypad 4, a common display 6, a secure module 8, a nonsecure module 10, a communication port 12 and a counter 14. The secure module 8 includes various encryption and decryption software and circuitry which is extremely difficult to access or to evaluate and as such is temper resistant. The secure module does include some memory, however, much of the memory is used for operating the software of the secure module. The nonsecure module 10 is readily accessible and certain functions of the terminal are stored in the nonsecure module. The nonsecure module also includes various applications which normally control the terminal by producing prompts and receiving and communicating data. The communication port 12 allows the terminal 2 to be connected to a financial institute or other body which is essentially okaying the transaction.

The terminal 2 would be provided on a counter adjacent a retailer's cash register, for example, and it is desirable to have this terminal as small as possible, as the space at the counter is at a premium. This has forced the terminal to use the common keyboard and common display for receiving prompts or entry of data in either a clear text mode or a secure text mode.

For example, clear text mode would include such data as telephone numbers, merchant I.D.'s, amount to be debited, etc. which is data that does not need to be encrypted. In contrast, PINs (Personal Identification Numbers) are entered into the terminal and this type of data must be secure text, i.e. the data must be encrypted and appropriately processed by the secure module. For example, entry of the PIN does not get displayed on the display. Typically an asterisk is shown for each entry. Other data might also be transmitted in secure text mode such as account balances, etc. which would be confidential information for the eyes of the card holder alone.

By producing a terminal having a common keyboard and a common display where data is entered through the keyboard in either a clear text mode or secure text mode, there is a higher risk that the security of the secured text is reduced.

In order to reduce the possibility of secured text being displayed, the terminal is configured by means of the secure module to always default to secure text and to only transmit in clear text, and in particular to only transmit a prompt to the display, when the device is in clear text mode when that prompt has been independently authenticated by the secure module.

Figure 2:
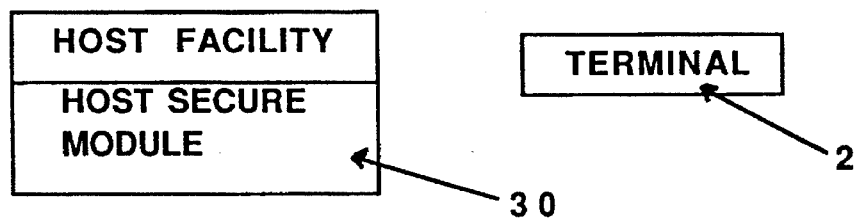
FIG. 2 is a schematic showing communication between a host secure module and a terminal typically used when the terminal is being programmed.
Figure 3:
FIG. 3 is a schematic of the terminal in communication with a financial institute such as would be the case when a transaction is occurring.

In order to more fully understand the system of the present invention, it is beneficial to consider the steps that are undertaken to initially program the terminal as indicated in FIGS. 2 and 7 where various data is loaded into the terminal 2 by means of the host secure module 30. The host secure module (HSM) will program the terminal 2 typically in an extremely secure environment. The host secure module includes the functions of a secure key generation/key injection facility. Typically during initialization, the HSM creates a double length key transfer key (KTK) and a single length data transfer key (DTK). The host secure module then encryptes the single length DTK using the double length KTK and a triple encryption process which results in an encrypted DTK indicated as eKTK (DTK). A DTK check value is also generated by encrypting 64 binary zeros using the DTK. This results in a eDTK(0). The HSM may also be instructed to generate a new Password to be used by the secure module (see FIG. 5). Both the old and new passwords are encrypted using the KTK. This results in eKTK(new Password) and eKTK(old Password). Various prompts are identified or inputted into the HSM which prompts are to be used during clear text entry. The HSM generates a standard 32 bit MAC for each prompt by processing the prompt and the DTK using the MACing software. If the prompt is not a multiple of 8 bytes, then the prompt is padded with binary zeros until it is. It is also assumed that the initial vector used in the MAC process is all binary zeros. The KTK, eKTK (old Password), eKTK (new Password), eKTK (DTK), eDTK (0) and each Prompt and associated MAC is forwarded to the secure module of the terminal.

The secure module loads the KTK, eKTK(old Password) and eKTK(new Password). The secure module decrypts eKTK(old Password) to obtain "old Password" which it compares with the one it currently holds. If there is a match, then eKTK(new Password) is decrypted to obtain "new Password" and both "new password" and "KTK" are installed in the secure module. If there is no match, then an error status is returned and no action is taken.

If the KTK and new Password are successfully installed, then the secure module loads the eKTK(DTK) and eDTK(0). The secure module then decryptes the eKTK(DTK) to get the DTK and encryptes the 64 binary zeros using the DTK to get eDTK(0). This check value, namely the eDTK(0), is then compared with the received eDTK(0). If these values match, then the DTK is accepted. The secure module then generates two independent keys, namely RN1 (Random Number 1) and RN2 (Random Number 2). The prompts and MAC pairs received from the HSM are loaded. The prompt is reMACed within the secure module and the resulting MAC is compared with the one sent from the HSM. If they are identical, then the prompt is accepted as valid. A valid prompt is then processed using RN1 to MAC the prompt, the 32 bit MAC is concatenated with 32 binary zeros and the result is encrypted using RN2. The result of the RN2 encryption is called an Authentication Parameter (AP) and is stored in the nonsecure module's main memory coupled with the associated prompt. With this arrangement, the terminal in the nonsecure module 10 has various pairs of prompts and their respective authentication parameters. The nonsecure module also includes application software for the generation of certain prompts or the passage of prompts to the display 6 via the secure module. The secure module is basically told by the nonsecure module to operate in a clear text mode or a secure text mode. When it is told to operate in the clear text mode, each prompt which is provided to the secure module by the nonsecure module has tagged thereto an authentication parameter. The secure module then takes the prompt and, in combination with Random Number 1 and Random Number 2, produces its own authentication parameter and when a match is obtained between the generated authentication parameter in the secure module and the authentication parameter that is associated with the prompt, then the prompt is transmitted to the display 6. In this way, the secure module has confirmed that this is an appropriate prompt for clear text mode. Each prompt that is forwarded to the secure module when the secure module is operating in the clear text mode is authenticated in the above manner. In this way, it is extremely difficult to reprogram the terminal to enter a prompt which is a prompt that should receive data in the secure text mode. The authentication parameter for each prompt will be unique to that prompt in that terminal. This is the result of generating different RN1 and RN2 in each terminal. Even though the same prompts may reside in many different terminals, the associated Authentication Parameter will be unique to each terminal. In some applications, Random Number 1 and Random Number 2 can equal the DTK. This is particularly useful where many security modules share a common nonsecure module. In this way, each terminal is unique and even knowledge of one terminal does not provide knowledge with respect to the other terminals. Furthermore, due to the security afforded to the keys by the security module and the encryption algorithm, it would be extremely difficult to ascertain the key. A summary chart showing the various functions of the host secure module and the various parts of the terminal is attached.

In addition to the above system, the terminal 2 includes a protected counter 14 which cannot be reset or tampered with without use of keys and passwords. Each time the secure module records an incorrect authentication value, it will increment counter 14. The maximum value of this counter is settable at the configuration time by the host secure module and once the maximum value has been reached, the secure module will no longer allow clear text entry until a purging or reauthorizing step has been carried out. Thus, each terminal will effectively shut itself down for clear text mode if the expected authentication processes are not occurring. This provides a fixed value on the number of times a would-be thief can query the system to try to determine how it works. This reauthorization step is carried out by loading the KTK in the clear. Since the load command is password protected, only the person or device possessing the password will be allowed to load, and thus reinitialize, the KTK.

With the terminal as described above, a high degree of security is accomplished, in that the terminal defaults to secure text mode, and when operated in clear text mode, each prompt has to be independently authenticated prior to transmission to the display. With such an arrangement, only prompts which have been properly introduced to the terminal and subsequently processed by the secure module to produce an authentication parameter for each prompt can operate the terminal in clear text mode. Any attempt to change the prompt will result in the authentication parameter being incorrect for that given prompt. The degree of encryption associated with the authentication parameter of each prompt is extremely high, involving several different keys, and being extremely difficult to decipher. Furthermore, the secure module is specifically designed so that its internal processes cannot be observed or modified.

With this terminal, a high degree of security of confidential information is maintained while achieving the space saving possible by means of a terminal using a common keypad and display. Additional features can be added to the system, such as the use of passwords providing a further level of protection with respect to the key transfer key, as well as a key hierarchy where the display transfer key is below the key transfer key and is a new key for terminals. A further feature of this terminal is that the host secure module determines what prompts are to be used for clear text mode, and it is only these prompts which allow the terminal to operate in clear text mode. All other prompts result in the device not transmitting the prompts to the display or the device working in secure text mode.

Figure 4:
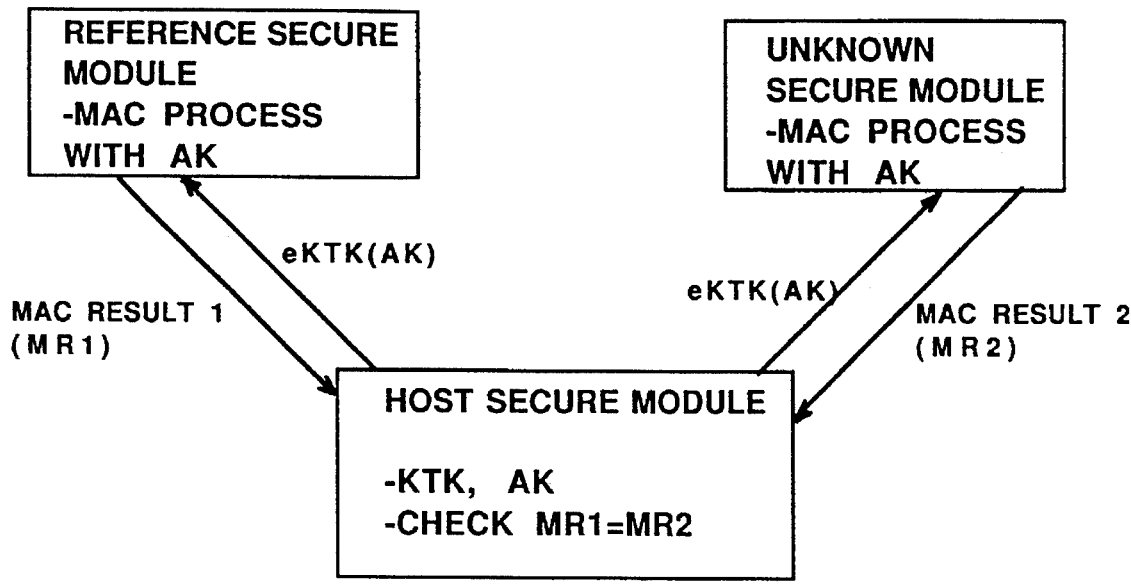
FIG. 4 illustrates an authentication check of a terminal.

It is also possible to further enhance security of the overall system by assessing the secure module of a terminal in the following manner and as shown in FIG. 4.

Prior to injecting cryptographic keys and other sensitive or secret information into an unknown secure module of a terminal, it is desirable to verify that the contents of the SM are the same as those of a known "reference" SM. This is accomplished in such a way that the contents are not actually known, but that an identical process is performed on both the reference and unknown SMs. If the results of executing this process in both reference and unknown are the same, then it can be inferred that the contents are the same. The process used in the terminal utilizes the MACing software in the SM and a cryptographic key (called the Authentication Key or AK).

This process of verifying the contents of the SM can be done at any time during the life of the product. This allows a central site to send an encrypted AK to the SM in, say, a retail shop and simultaneously send an encrypted AK to the reference SM (held securely at the central site). The process outlined below is executed in both SMs and the results sent back to the central site for comparison. If they do not match, then this may indicate that the SM in the terminal at the retail site has been tampered with.

Operation Steps:
1) The HSM generates a KTK and an AK.
2) The KTK is injected into the reference SM and the unknown SM.
3) The AK is encrypted using the KTK(eKTK(AK)) and sent to the reference SM and the unknown SM.
4) Both the reference SM and the unknown SM decrypt the eKTK(AK) using the KTK previously injected.
5) Both reference and unknown terminals MAC the same block of SM memory and return the results.
6) The HSM compares the two results and if they are the same, then the unknown terminal is assumed to have the same software as the reference terminal.

Password Controlled KTK Loading

Fraud of the kind commonly called spoofing (i.e. to fool) can be perpetrated by injecting known cryptographic keys into the SM. Since the SM has a hierarchical key structure (i.e. any key, except the top level, must be loaded into the SM encrypted under the key above it in the hierarchy), the top level must be protected from unauthorized modification. If this is done, then the entire hierarchy is protected.

The SM has a
- 64-bit long password. There will be an initial or default password, such as "VERIFACT". This initial password should be changed to a password known only to the HSM when the initial KTK is injected. The new password should be generated with as much randomness as that afforded the generation of a cryptographic key. Having injected this new password into the SM, it becomes virtually impossible for an attacker with no knowledge of the password to inject a known KTK.

Figure 5:
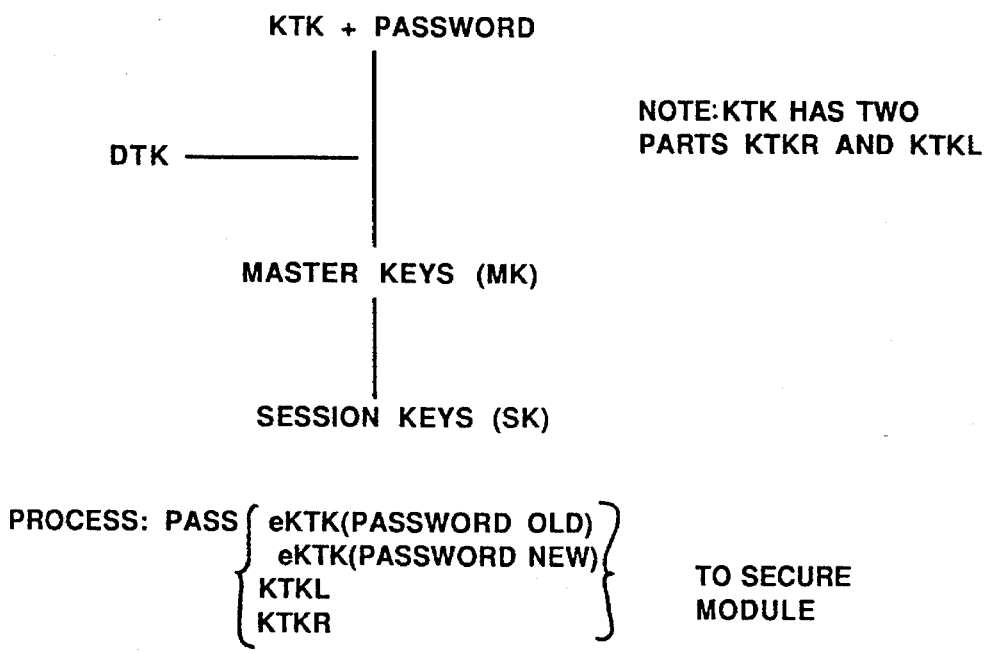
FIG. 5 illustrates the key hierarchy.
Figure 6:
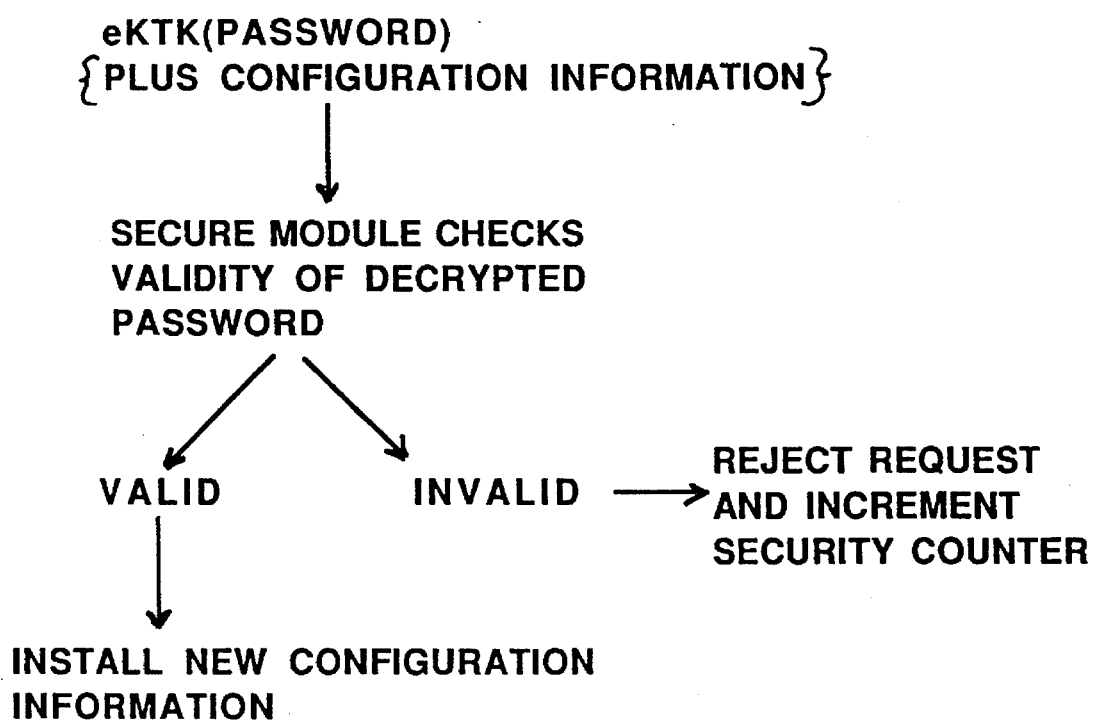
FIG. 6 illustrates key loading of a terminal.

The key hierarchy is shown in FIG. 5.

Password and KTK Controlled Loading of System Configuration Information

The SM has a mechanism for receiving configuration information that defines the keyboard, the key management scheme to be used, and allows for the setting and resetting of the tamper detection counter, called the security counter. This mechanism must be protected from casual or concerted efforts to alter any of the settings. This is accomplished by coupling the password and KTK through encryption (eKTK(password)). Alteration of this information will be allowed only if the correct eKTK(password) cryptogram is presented to the SM. This forces the attacker to guess both the KTK and the password, a task formidable enough to force an attacker to search for an easier means.

Password Protected KTK Loading

Loading the KTK in the clear must be done in a secure environment due to the importance of the KTK being at the top of the key hierarchy. If the KTK is known, or ascertained, then the DTK can be altered to one known by the would-be thief. Gaining control of the DTK will then allow the attacker to validate prompts that will request secure data to be entered while the SM is in clear text mode. Thus, the attacker could collect PINs in unencrypted form. This problem is further reduced by using a password in combination with the KTK.

The resetting of the security counter is controlled by an access parameter which is the password encrypted by the KTK (i.e. eKTK(password)). Since this access parameter requires knowledge of both the KTK and password, it is highly unlikely the attacker would try to gain access to resetting the security counter. The security counter is also recording each unsuccessful attempt to gain access to it.

Although various preferred embodiments of the present invention have been described herein in detail, it will be appreciated by those skilled in the art, that variations may be made thereto without departing from the spirit of the invention or the scope of the appended claims.

THE EMBODIMENTS OF THE INVENTION IN WHICH AN EXCLUSIVE PROPERTY OR PRIVILEGE IS CLAIMED ARE DEFINED AS FOLLOWS:

1. A transaction terminal comprising a tamper resistant secure module, a display, a keyboard and a non-secured portion, said tamper resistant secure module acting as an intermediary and controlling the communication of data and prompts between said keyboard, said display, and said non-secured portion of said terminal in either non-encrypted clear text mode or encrypted secure text mode, said keyboard allowing the entry of data, said non secured portion of said terminal having a predetermined group of prompts and authentication parameters where each prompt is paired with an authentication parameter and some of said paired prompts and authentication parameters are authorized for non-encrypted clear text mode and some of said paired prompt and authentication parameters are authorized for encrypted secure text mode, said tamper resistant secure module having confirmation means to independently confirm the prompt of a prompt pair received form said non-secured portion is a proper prompt for non-encrypted clear text mode prior to communication of said prompt to said display.

2. A transaction terminal as claimed in claim 1 wherein said confirmation means confirms the prompt of the prompt pair is a proper prompt by generating its own authentication parameter for the given prompt and only continuing in non-encrypted clear text mode if the generated authentication parameter equals the authentication parameter of said pair.

3. A transaction terminal as claimed in claim 2 wherein said terminal always defaults to encrypted secure text mode and each prompt in non-encrypted clear text mode is independently confirmed by said confirmation means prior to continuing in non-encrypted clear text mode.

4. A transaction terminal as claimed in claim 2 wherein said confirmation means independently confirms said authentication parameter by means of an algorithm using said prompt as one encryption key.

5. A transaction terminal as claimed in claim 4 wherein said tamper resistant secure module includes two additional encryption keys for said algorithm which are used in generation of said authentication parameter.

6. A transaction terminal as claimed in claim 5 wherein said two additional encryption keys are random numbers generated by said tamper resistant secure module.

7. A transaction terminal as claimed in claim 6 wherein said tamper resistant secure module includes decryption software by means of which an encrypted data transfer encryption key provided to said terminal is decrypted by said tamper resistant secure module to determine the data transfer key with said tamper resistant secure module using said data transfer encryption key to encrypt data in said encrypted secure text mode.

8. A transaction terminal as claimed in claim 7 wherein said tamper resistant secure module includes means for receiving pairs of data corresponding to a prompt and a authentication parameter for non-encrypted clear text mode, and means for confirming the received pairs are for non-encrypted clear text mode by using said data transfer encryption key and an algorithm to produce a secure module control parameter which must match the received authentication parameter of said pair for said prompt to be accepted and confirmed by said secure module and used in non-encrypted clear text mode.

9. A transaction terminal as claimed in claim 8 wherein said secure module includes means for generating its own separate control parameter for each prompt received for non-encrypted clear text mode and each prompt and separate control parameter are stored in said non secured portion of said terminal.

10. A point of purchase terminal comprising a display, a tamper resistant secure module, a keypad, a non secure module, a communication port for communicating with an outside source, said terminal operating in either a non-encrypted clear text mode where data is transmitted in a non encrypted form and in an encrypted secure text mode where data is transferred in an encrypted form, said secure module including means for receiving prompts for clear text mode and means for generating an authentication parameter for each prompt and means for transmitting and storing each paired prompt and authentication parameter in said non secure module, said non secure module including means for instructing said secure module to operate in clear text mode and to provide pairs of prompts and authentication parameters to said secure module in clear text mode, said secure module when operating in clear text mode including means for confirming each prompt by regenerating the authentication parameter for the prompt and only transmitting the prompt to said display terminal if the regenerated authentication parameter corresponds to the authentication parameter provided with the pair.

11. A terminal as claimed in claim 10 wherein said terminal includes in said secure module means for receiving additional inputted prompts and authentication parameters to be used in clear text mode and confirms each additional inputted prompt is authorized for clear text mode based on an evaluation of said authentication parameter by said means for confirming each prompt.

12. A terminal as claimed in claim 11 wherein said secure module, after confirming a received inputted prompt is authorized for clear text model uses said means for generating to pair said prompt with a new authentication parameter which pair is subsequently stored in said non secure module.

13. A transaction terminal comprising a tamper resistant security module, a non-secured portion, a display for displaying data for a user or displaying a prompt provided by said non-secured portion to request a user to input certain data, and a keypad through which a user can input data; said tamper resistant security module, said display, said keypad and said non-secured portion cooperating to communicate data or prompts therebetween; said tamper resistant security module acts as an intermediary and encrypts certain data when communicated between said keyboard, said display, and said non-secured portion of said terminal; said non-secured portion controlling the general operation of the terminal and providing to said tamper resistant security module prompts and authentication parameters where each prompt is paired with a particular authentication parameter, said tamper resistant security module relaying data inputted at said keypad to said non-secured portion in a clear text mode where the data is not encrypted or in a secure text mode where the data is encrypted dependent upon the particular prompt and authentication parameter provided to said tamper resistant security module by said non secured portion; said paired prompts and authentication parameters being stored in said non secured portion, and said tamper resistant security module having confirmation means which prior to any communication in clear text mode uses the provided prompt to generate an authentication parameter and operates in dear text mode if the generated authentication parameter corresponds to the authentication parameter provided with the prompt.

14. A transaction terminal as claimed in claim 13 wherein said confirmation means includes an algorithm and said provided prompt is used as an input for said algorithm which generates said generated authentication parameter.

* * * * *